(12) United States Patent
Matsunaga et al.

(10) Patent No.: US 10,128,726 B2
(45) Date of Patent: Nov. 13, 2018

(54) METHOD FOR MANUFACTURING A LAMINATE AND METHOD FOR MANUFACTURING A ROTOR

(71) Applicants: Mitsui High-tec, Inc., Kitakyushu-shi, Fukuoka (JP); HONDA MOTOR CO., LTD., Tokyo (JP)

(72) Inventors: Yukio Matsunaga, Kitakyushu (JP); Hisatomo Ishimatsu, Kitakyushu (JP); Yusuke Hasuo, Kitakyushu (JP); Masahiro Izumi, Kitakyushu (JP); Manabu Yazaki, Wako (JP)

(73) Assignee: MITSUI HIGH-TEC, INC., Minato-ku, Tokyo (JP)

( * ) Notice: Subject to any disclaimer, the term of this patent is extended or adjusted under 35 U.S.C. 154(b) by 263 days.

(21) Appl. No.: 14/757,783

(22) Filed: Dec. 23, 2015

(65) Prior Publication Data
US 2016/0233748 A1    Aug. 11, 2016

(30) Foreign Application Priority Data

Dec. 24, 2014   (JP) ................. 2014-260407

(51) Int. Cl.
| | |
|---|---|
| *H02K 15/02* | (2006.01) |
| *H02K 15/10* | (2006.01) |
| *H02K 15/03* | (2006.01) |
| *H02K 1/27* | (2006.01) |
| *H02K 15/12* | (2006.01) |

(52) U.S. Cl.
CPC ............. *H02K 15/03* (2013.01); *H02K 1/276* (2013.01); *H02K 15/02* (2013.01); *H02K 15/12* (2013.01); *H02K 2213/09* (2013.01)

(58) Field of Classification Search
CPC ........ H02K 15/03; H02K 1/276; H02K 15/02; H02K 15/12
See application file for complete search history.

(56) References Cited

U.S. PATENT DOCUMENTS

| | | | | |
|---|---|---|---|---|
| 8,058,767 | B2* | 11/2011 | Haruno ................. | H02K 1/276 310/156.01 |
| 9,780,613 | B2* | 10/2017 | Yamaguchi .......... | H02K 1/2766 |
| 2007/0126310 | A1* | 6/2007 | Tang ...................... | H02K 1/146 310/216.004 |

(Continued)

FOREIGN PATENT DOCUMENTS

| | | |
|---|---|---|
| JP | H10-127015 A | 5/1998 |
| JP | 2007-336608 A | 12/2007 |

(Continued)

*Primary Examiner* — Paul D Kim
(74) *Attorney, Agent, or Firm* — Procopio, Cory, Hargreaves & Savitch LLP

(57) ABSTRACT

A method for manufacturing a laminate used for manufacturing a rotor is provided. The method includes: (a) stamping out a plurality of workpieces from a metal sheet wherein each of the workpieces has a temporarily-interlocking portion; and (b) obtaining a laminate including the workpieces integrated together by the temporarily-interlocking portion, wherein each of the workpieces further has a shaft hole, a magnet insertion hole, and a weight-reducing hole formed between the shaft hole and the magnet insertion hole, and the temporarily-interlocking portion is provided to the weight-reducing hole.

11 Claims, 18 Drawing Sheets

(56) References Cited

U.S. PATENT DOCUMENTS

2014/0175930 A1* 6/2014 Adaniya ................ H02K 1/276
310/156.11

FOREIGN PATENT DOCUMENTS

| JP | 2009-118704 | A | 5/2009 |
| JP | 5357187 | B2 | 12/2013 |
| JP | 2014-176891 | A | 9/2014 |
| WO | 2010082465 | | 7/2010 |

* cited by examiner

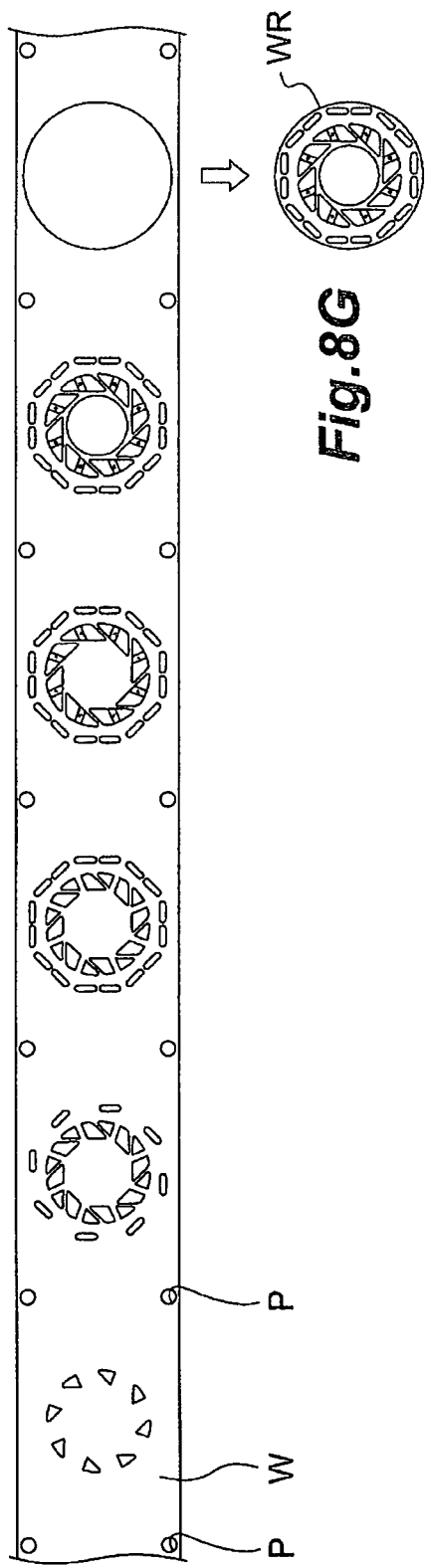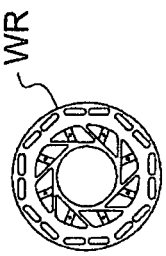

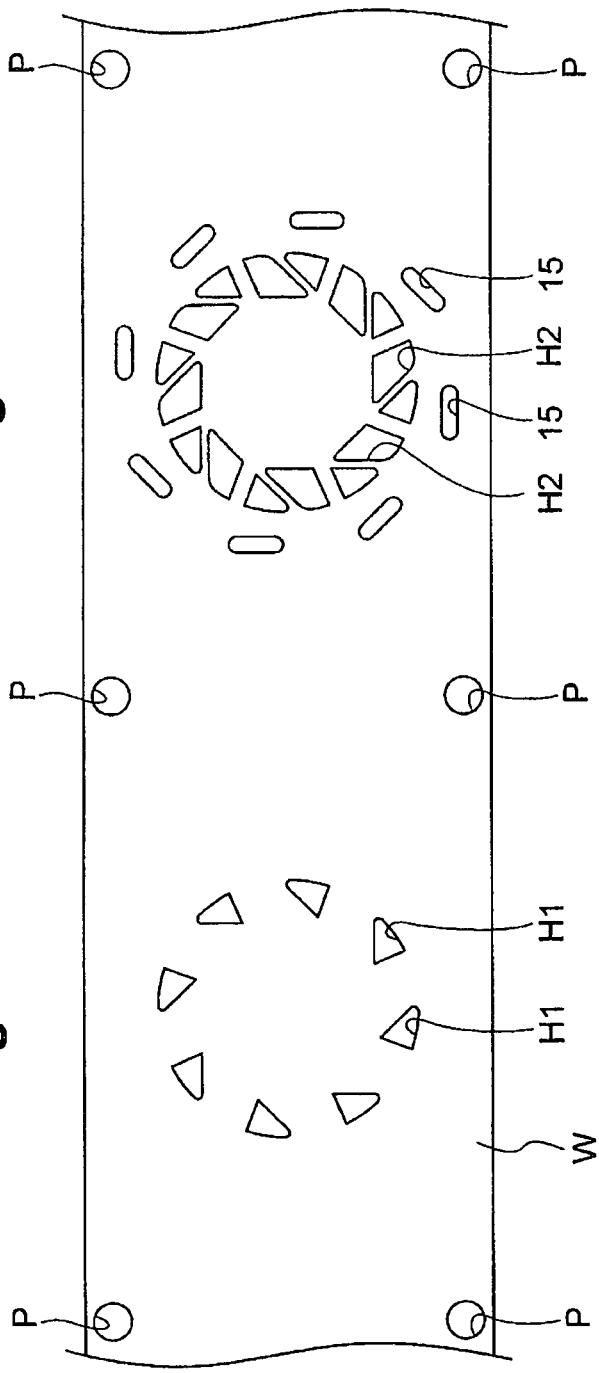

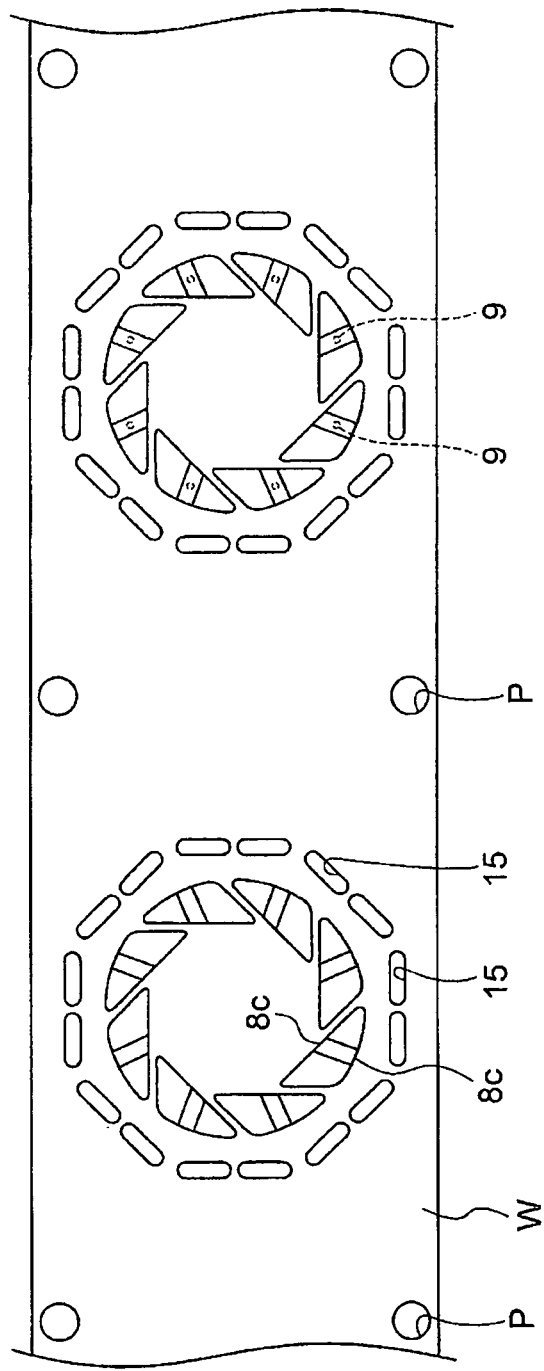

METHOD FOR MANUFACTURING A LAMINATE AND METHOD FOR MANUFACTURING A ROTOR

CROSS-REFERENCE TO RELATED APPLICATION

This application is based upon and claims the benefit of priority from Japanese Patent Application No. 2014-260407, filed Dec. 24, 2014, the entire contents of which are incorporated herein by reference.

BACKGROUND

1. Field

This disclosure relates to a laminate and a method for manufacturing the same and a method for manufacturing a rotor.

The laminated core is a component of a motor. The laminated core is formed by stacking a plurality of magnetic metal sheets each of which is processed in a predetermined shape and fastening the sheets together. The motor includes a rotor and a stator each of which contains a laminated core, and is produced through a step of winding a coil on the stator and a step of attaching a shaft to the rotor, for example. Motors incorporating laminated cores have been conventionally used as driving sources for refrigerators, air conditioners, hard disc drives, and electric tools, for example, and are also used as driving sources for hybrid cars these days.

As means for fastening vertically adjacent magnetic metal pieces together in a process of manufacturing a laminated core, swaging and welding are known. These fastening means are excellent in cost and work efficiency, and have been conventionally widely used. Alternatively, when higher priorities are given to greater torque and lower iron loss of a motor, instead of swaging or welding, the magnetic metal sheets may be fastened together by using resin material or adhesive.

2. Related Background Art

WO2010/082465 discloses a method for manufacturing a laminated core 110 by temporarily binding a plurality of core sheets 50 with fixtures 120 each having a swaged area and then permanently binding the sheets with resin material. Specifically, in the method described in WO2010/082465, a segmented stator is manufactured through a step of temporarily binding together the core sheets 50 with the fixtures 120 arranged outside the laminated core 110, a step of permanently binding the laminated core 110 with an insulating resin 13 formed by die-cast molding, for example, and a step of removing the fixtures 120 from the laminated core 110 after permanently binding the laminated core 110 (see FIGS. 2 and 3 in WO2010/082465). By removing the fixtures 120 each having the swaged area from the laminated core 110 in the manufacturing process, the stator 200 having no swaged area is finally obtained.

SUMMARY

In this disclosure, a portion that has a swaged area formed thereon, is used for temporarily integrating a laminate, and is then removed from the laminate in a process of producing a product (laminated core) is referred to as a "temporarily-interlocking portion". A block into which such temporarily-interlocking portions are laminated and integrated together by swaged areas is referred to as a "temporarily-interlocking part".

A manufacturing method according to one aspect of this disclosure is a method for manufacturing a laminate used for manufacturing a rotor. The method includes: (a) stamping out a plurality of workpieces from a metal sheet wherein each of the workpieces has a temporarily-interlocking portion; and (b) obtaining a laminate including the workpieces integrated together by the temporarily-interlocking portion. Each of the workpieces further has a shaft hole, a magnet insertion hole, and a weight-reducing hole formed between the shaft hole and the magnet insertion hole. The temporarily-interlocking portion is provided to the weight-reducing hole.

BRIEF DESCRIPTION OF THE DRAWINGS

FIGS. 8A to 8G are plan views illustrating an overall layout of stamping serially performed by a progressive die.

FIG. 9A and FIG. 9B are plan views illustrating a layout of the stamping in an initial stage.

FIG. 10C and FIG. 10D are plan views illustrating a layout of the stamping in a middle stage.

DETAILED DESCRIPTION

Figure 1:
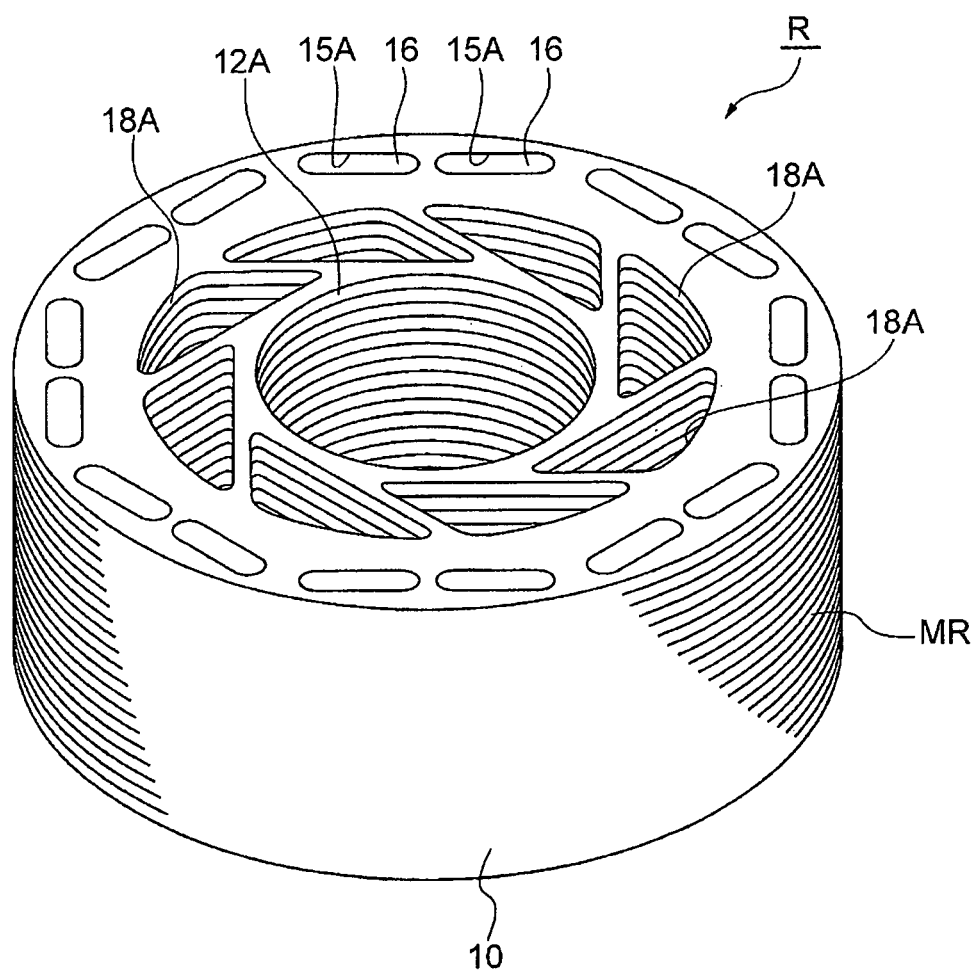
FIG. 1 is a perspective view illustrating one example of a rotor.

Hereinafter, a plurality of embodiments of this disclosure will be described with reference to the accompanying drawings. In the description of the drawings, the same elements will be designated by the same reference numerals and a duplicate description thereof will be omitted. The drawings and the related technologies are provided in order to describe the embodiments of this disclosure, and do not limit the scope of this disclosure.

Figure 2:
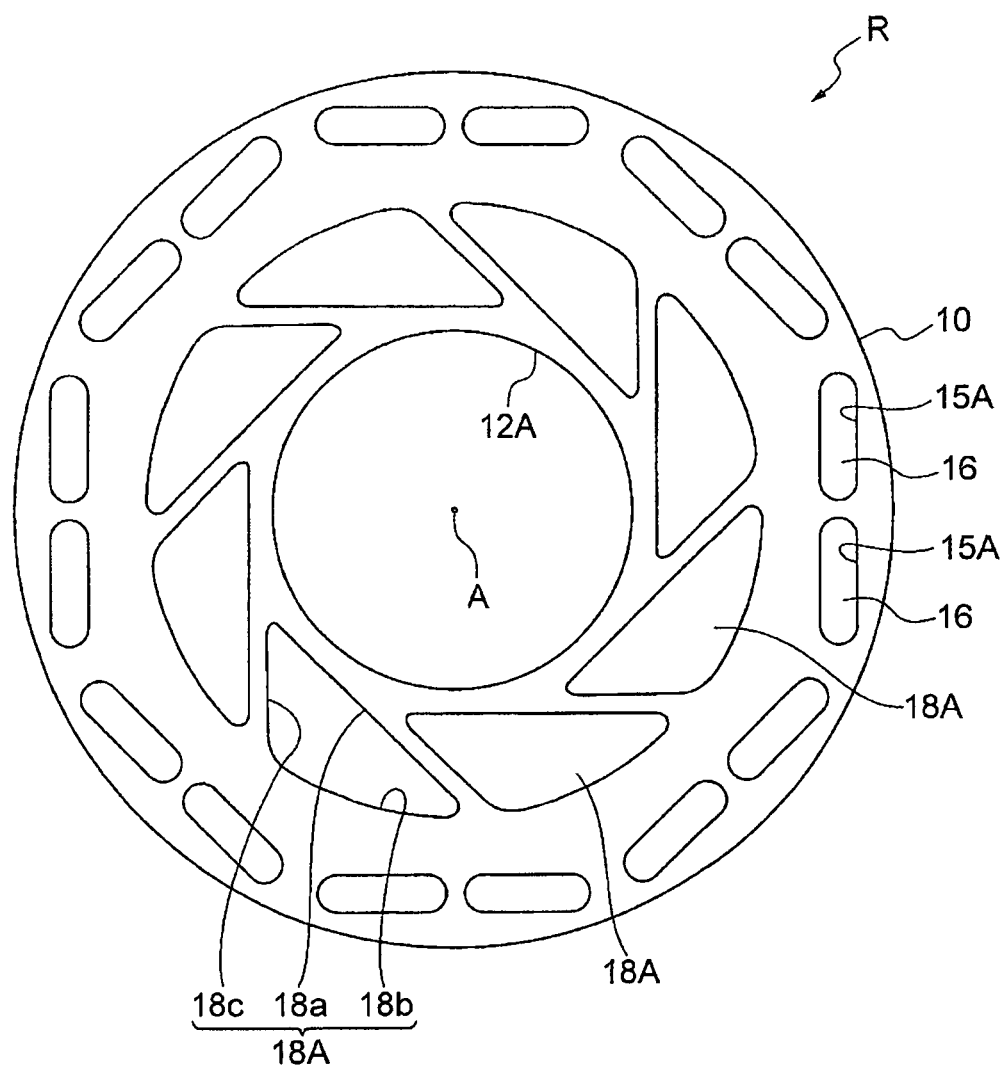
FIG. 2 is a plan view of the rotor depicted in FIG. 1.

<Rotor> FIG. 1 and FIG. 2 are a perspective view and a plan view, respectively, of a rotor R according to the present embodiment. The shape of the rotor R is substantially cylindrical. The rotor R includes: a laminate 10 including a plurality of magnetic metal sheets MR; a shaft hole 12A, positioned in a central part of the laminate 10, into which a shaft (not depicted) is inserted; magnet insertion holes 15A into each of which a magnet is inserted; and weight-reducing holes 18A formed between the shaft hole 12A and the magnet insertion holes 15A.

The rotor R has a plurality of magnet insertion holes 15A formed aligned in the circumferential direction, a total of 16 magnet insertion holes 15A in the present embodiment. Two adjacent magnet insertion holes 15A form a pair. The eight pairs of magnet insertion holes 15A are aligned at regular intervals along the outer circumference of rotor R. The respective magnet insertion holes 15A extend from the upper surface to the lower surface of the rotor R. Herein, the total number of the magnet insertion holes 15A is not limited to 16, and may be determined based on the intended use and required performance, for example, of the motor. The shape and positions of the magnet insertion holes 15A may be determined based on the intended use, required performance, and other requirements of the motor.

Each magnet insertion hole 15A accommodates a magnet (not depicted). The magnet is a permanent magnet, and a sintered magnet such as a neodymium magnet can be used. The number of magnets inserted into each magnet insertion hole 15A may be one, or may be two or more. The type of the magnet may be determined based on the intended use and required performance, and other requirements of the motor. Instead of the sintered magnet, for example, a bond magnet may be used. Alternatively, a plurality of magnets may be used that are segmented in the lamination thickness direction or the width direction, or in both of these directions. After inserting the magnet into each magnet insertion hole 15A, the magnet can be fixed in the magnet insertion hole 15A by filling the magnet insertion hole 15A with a resin material 16.

As the resin material 16, for example, a thermo-setting resin can be used. Specific examples of the thermo-setting resin include resin compositions containing an epoxy resin, a curing initiator, and an additive. Examples of the additive include a filler, a flame retardant, and a stress-lowering agent. The resin material 16 sticks the vertically adjacent magnetic metal sheets MR together. As the resin material 16, a thermoplastic resin may be used.

The rotor R has a total of eight weight-reducing holes 18A between the shaft hole 12A and the magnet insertion holes 15A. Specifically, the shaft hole 12A is formed in the central part of the rotor R, and the weight-reducing holes 18A and the magnet insertion holes 15A are formed in this order from the central part toward the outer circumference. As depicted in FIG. 2, each weight-reducing hole 18A has a substantially triangle shape, and has a side (inner surface) 18a extending parallel to a tangent of the shaft hole 12A, a side (inner surface) 18b extending parallel to the outer circumference of the rotor R, and a side (inner surface) 18c extending parallel to the side 18a of the adjacent weight-reducing hole 18A. The eight weight-reducing holes 18A are aligned along the circumferential direction of the shaft hole 12A. More specifically, in plan view, the eight weight-reducing holes 18A are arranged so as to be point-symmetrical about the central axial line A of the rotor R as a symmetrical point, and also are formed so that positions of the respective weight-reducing holes 18A match the respective adjacent positions when the magnetic metal sheets MR is rotated 45° about the symmetrical point.

<Laminate for a Rotor Including Temporarily-interlocking Parts>

Figure 3:
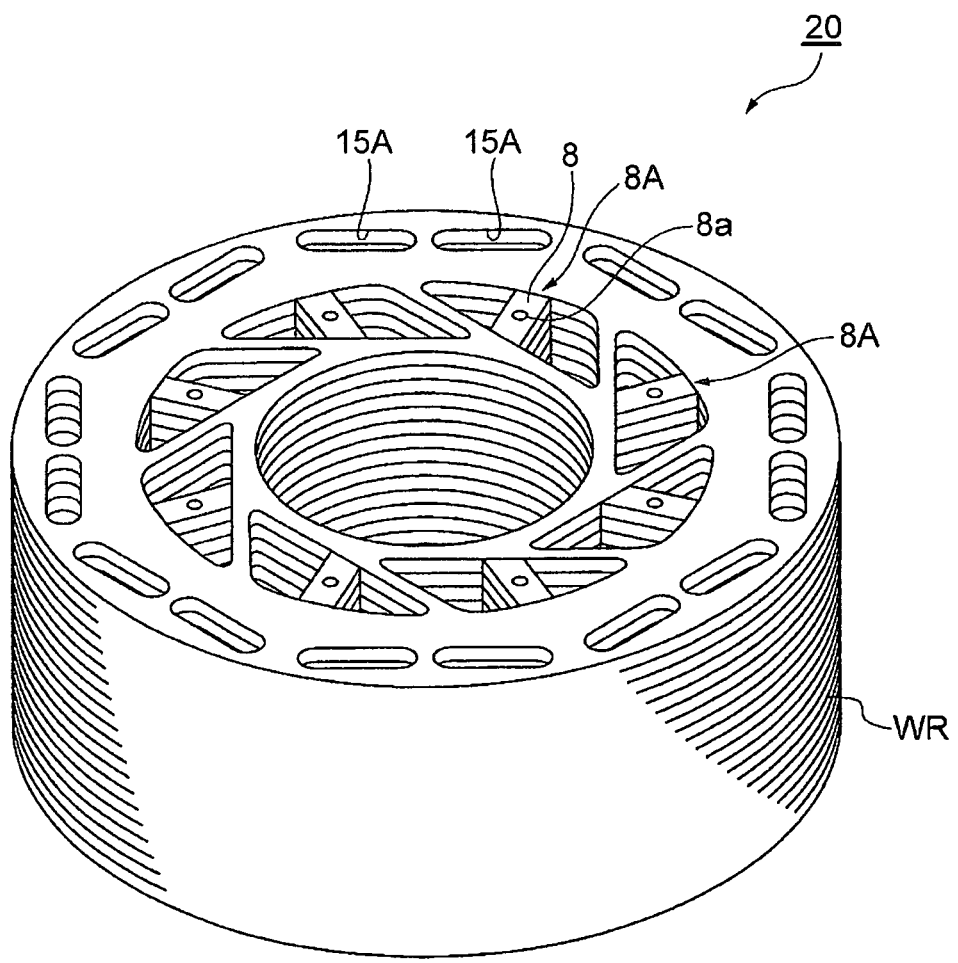
FIG. 3 is a perspective view illustrating one example of a laminate including temporarily-interlocking parts at weight-reducing holes.
Figure 4:
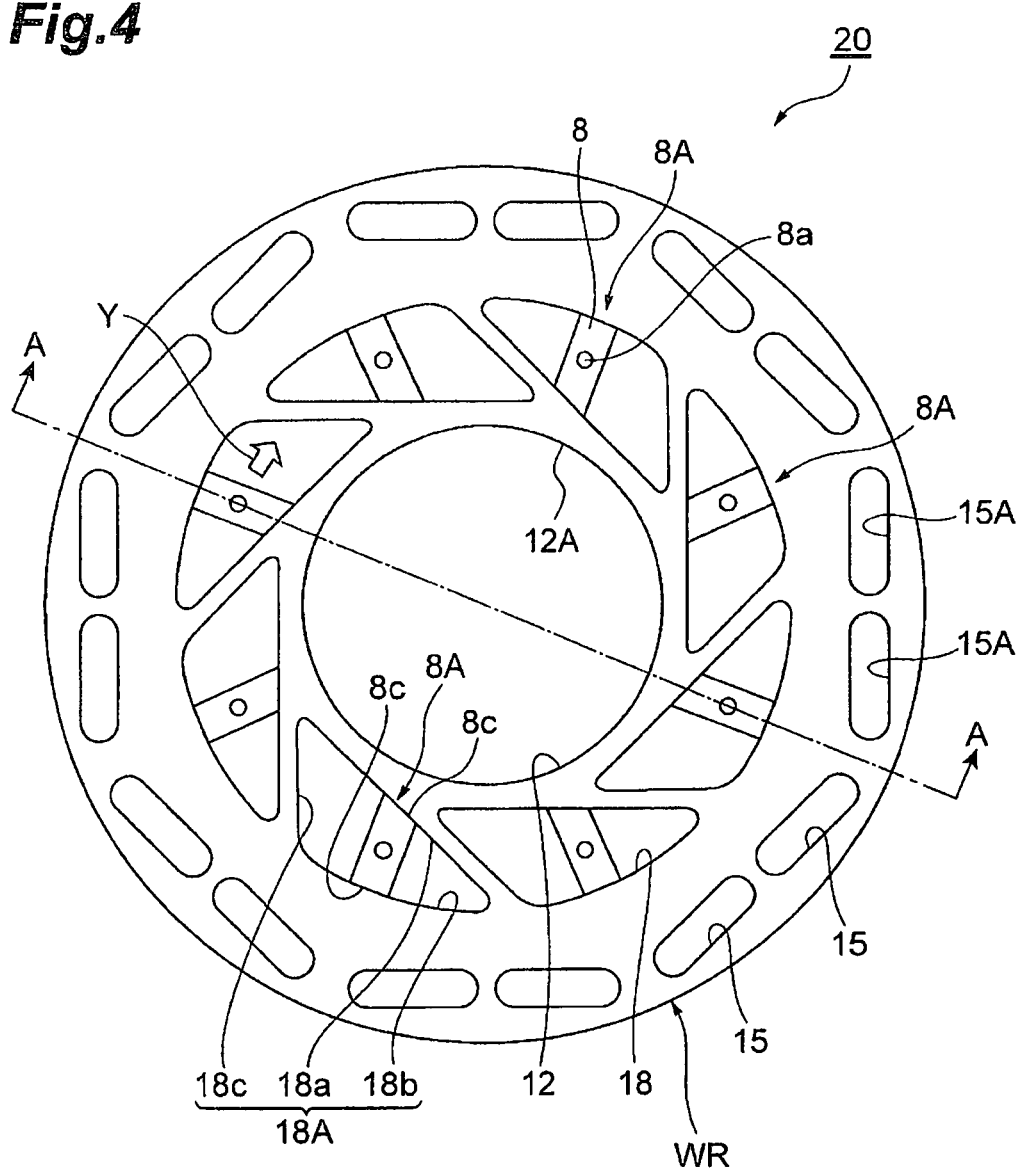
FIG. 4 is a plan view of the laminate depicted in FIG. 3.

FIG. 3 and FIG. 4 are a perspective view and a plan view, respectively, of a laminate 20 used for manufacturing the rotor R. The laminate 20 has the temporarily-interlocking parts 8A in the weight-reducing holes 18A. The rotor R is manufactured through a step of filling the magnet insertion holes 15A of the laminate 20 with the resin material 16 and a step of removing the temporarily-interlocking parts 8A from the weight-reducing holes 18A of the laminate 20.

The temporarily-interlocking parts 8A each are provided to each weight-reducing hole 18A, and are formed so as to bridge the opposing two sides (inner surfaces) 18a and 18b of the weight-reducing hole 18A. Each temporarily-interlocking part 8A is structured with a plurality of temporarily-interlocking portions 8 being laminated. The temporarily-interlocking portions 8 are formed in a process of stamping a magnetic metal sheet to produce a workpiece WR (see FIG. 11E). Depending on the size of the weight-reducing holes 18A, each temporarily-interlocking portion 8 is a belt-like member having a width of 3 to 40 millimeters for strength, and has a swaged area 8a formed in its center.

Referring to FIG. 4, each workpiece WR constituting the laminate 20 will be described. In plan view, the workpiece WR has substantially the same outer shape as that of the laminate 20. Specifically, the workpiece WR includes a shaft hole 12 (hole constituting the shaft hole 12A of the laminate 20) into which a shaft (not depicted) is inserted, magnet insertion holes 15 (holes constituting the magnet insertion holes 15A of the laminate 20) into each of which a magnet is inserted, and weight-reducing holes 18 (holes constituting the weight-reducing holes 18A of the laminate 20) formed between the shaft hole 12 and the magnet insertion holes 15. The temporarily-interlocking portions 8 are provided to the respective weight-reducing holes 18. A plurality of workpieces WR are integrated by the temporarily-interlocking portions 8 into the laminate 20. Herein, the temporarily-interlocking part 8A is a block that is formed by laminating the temporarily-interlocking portions 8 together.

Figure 6A:
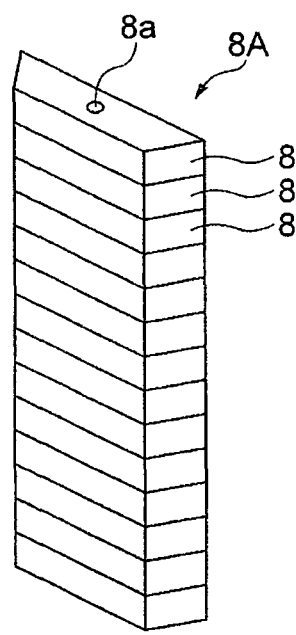
FIG. 6A is a perspective view schematically illustrating one example of each temporarily-interlocking part.

As depicted in FIG. 4, the two sides (inner surfaces) 18a and 18b each having a part connecting to the corresponding temporarily-interlocking part 8A extend so that the distance therebetween is wider at positions farther from the intersection point of these sides. As depicted in FIG. 6A, each temporarily-interlocking part 8A has a substantially isosceles trapezoidal shape in plan view. This shape is advantageous because the temporarily-interlocking part 8A can be easily removed in a direction (the direction of the arrow Y in FIG. 4) orthogonal to the laminating direction of the laminate 20.

Figure 5:
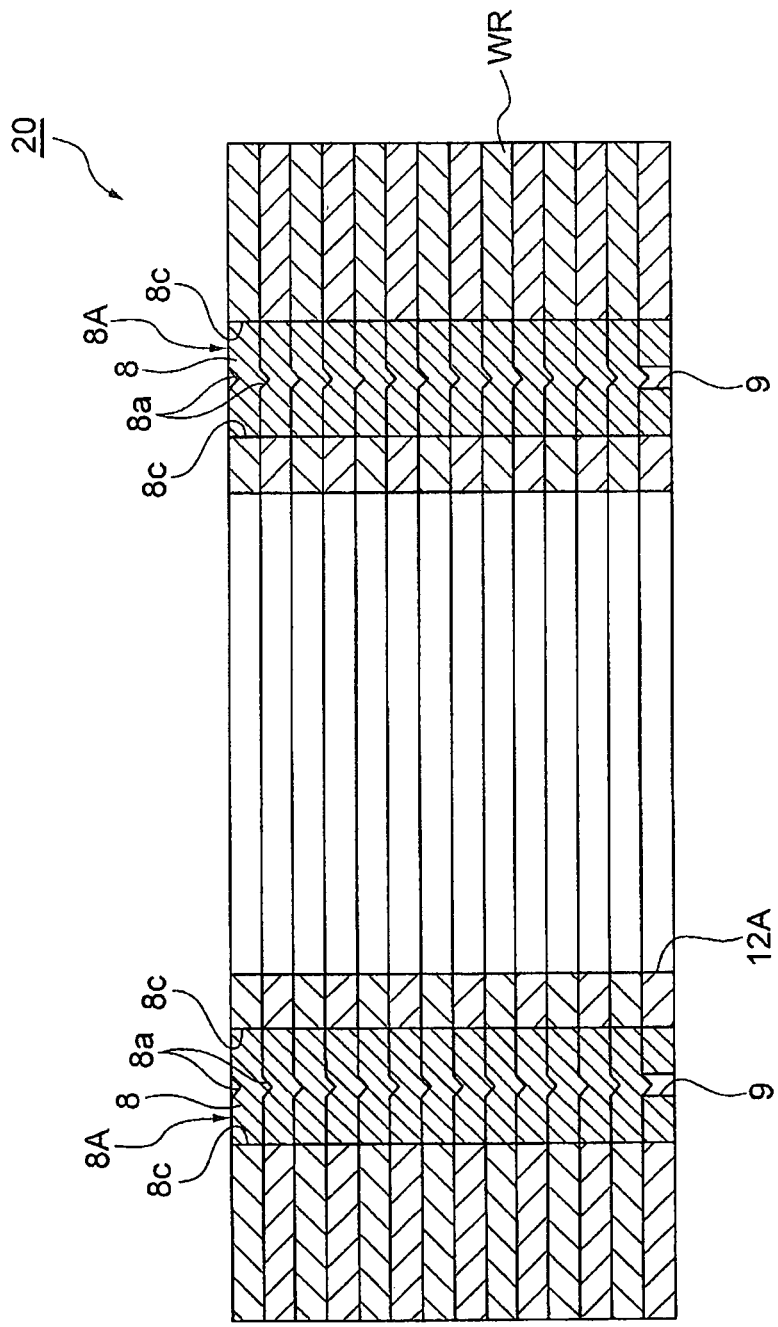
FIG. 5 is a schematic sectional view along line A-A in FIG. 4.
Figure 6B:
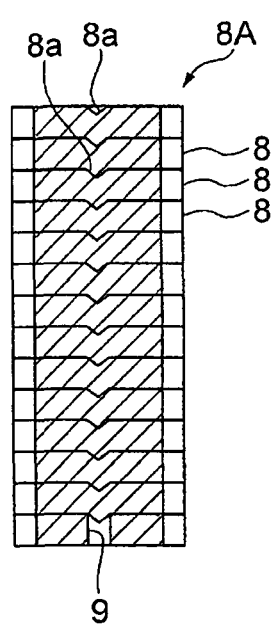
FIG. 6B is a schematic longitudinal sectional view of the temporarily-interlocking part.

As depicted in FIG. 5, FIG. 6A, and FIG. 6B, the temporarily-interlocking portions 8 the number of which is the same as that of the workpieces WR constituting the rotor R overlap each other, thereby constituting the temporarily-interlocking part 8A. In order to prevent a plurality of laminates 20 from being fastened to each other when the laminates 20 are stacked together, each temporarily-interlocking portion 8 positioned at the lowermost surface of each laminate 20 has a punched hole 9 instead of the swaged area 8a (see FIG. 5 and FIG. 6B). At each connecting part between each side of the weight-reducing holes 18 and the corresponding temporarily-interlocking portion 8, a cut 8c is formed by push-back.

Figure 7:
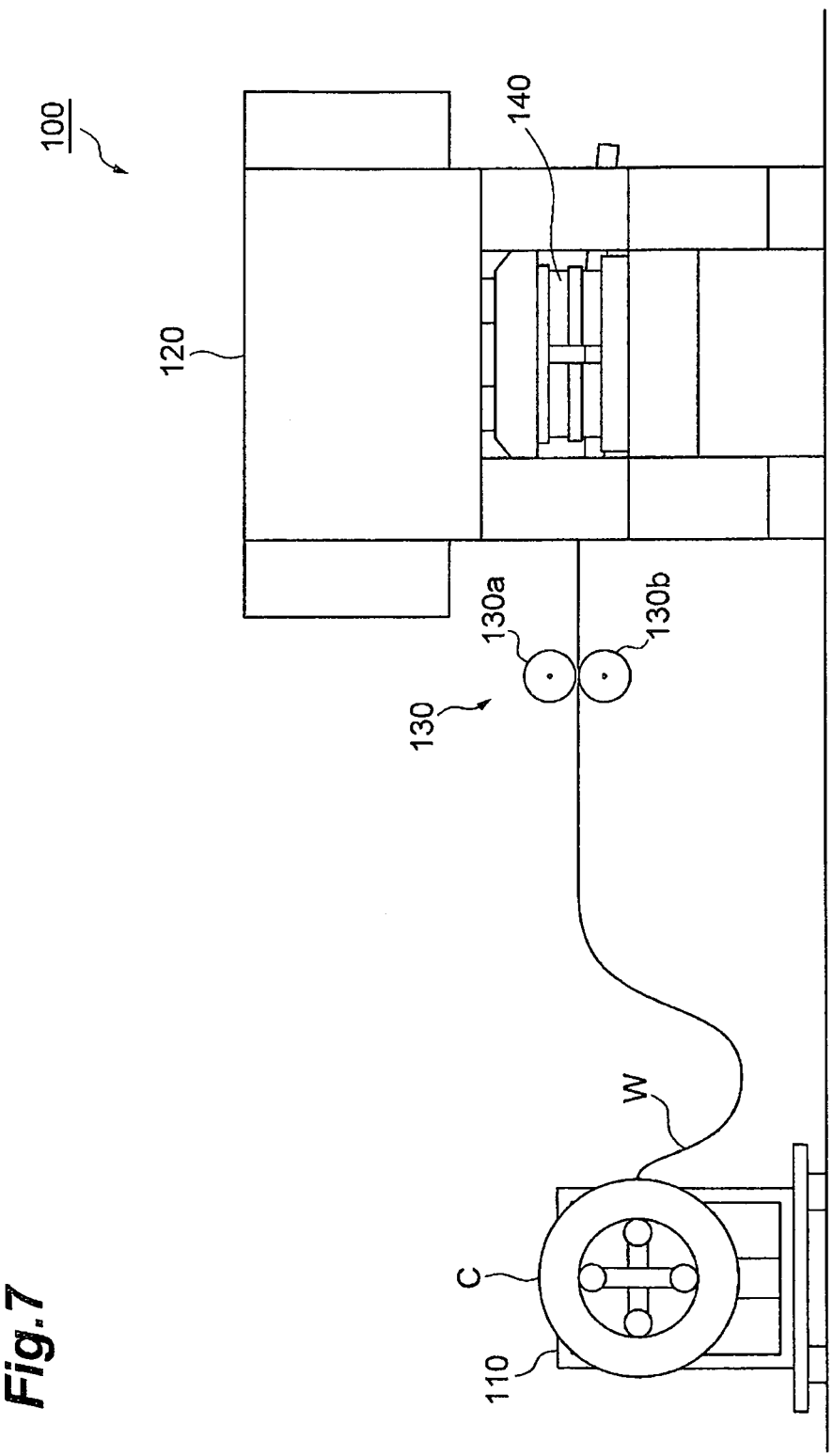
FIG. 7 is a schematic diagram illustrating one example of a stamping device.

<Stamping device> FIG. 7 is a schematic diagram illustrating one example of a stamping device for producing workpieces WR (magnetic metal sheets MR each having temporarily-interlocking portions 8) constituting a laminate 20 by stamping. The stamping device 100 depicted in FIG. 7 includes an uncoiler 110 on which a roll C is mounted, a feeder 130 configured to feed a magnetic metal sheet (hereinafter, referred to as "metal sheet W") drawn from the roll C, a progressive die 140 configured to perform stamping on the metal sheet W, and a press machine 120 configured to cause the progressive die 140 to operate.

The uncoiler 110 rotatably holds the roll C. The length of the metal sheet (for example, a magnetic steel sheet) constituting the roll C is 500 to 10000 meters, for example. The thickness of the metal sheet constituting the roll C may be about 0.1 to 0.5 millimeter, or may be about 0.1 to 0.3 millimeter from a viewpoint of achieving more excellent magnetic properties of the laminated core R. The width of the metal sheet W may be about 50 to 500 millimeters.

The feeder 130 has a pair of rollers 130a and 130b that sandwich the metal sheet W from above and below. The metal sheet W is fed into the progressive die 140 via the feeder 130. The progressive die 140 is a device configured to serially perform stamping and push-back, for example, on the metal sheet W.

<Method for manufacturing a rotor>The following describes a method for manufacturing a rotor R. The rotor R is manufactured through a process of producing a laminate 20 integrated by the temporarily-interlocking portions 8 (steps (A) to (C) below) and a process of producing a rotor R from the laminate 20 (steps (D) and (E) below). More specifically, the method for manufacturing a rotor R includes the following steps:

(A) a step of feeding a metal sheet W drawn from the roll C to the progressive die 140;
(B) a step of performing stamping on the metal sheet W by the progressive die 140 to obtain a workpiece WR having temporarily-interlocking portions 8 in the weight-reducing holes 18;
(C) a step of integrating a plurality of workpieces WR together by the temporarily-interlocking portions 8 to obtain a laminate 20;
(D) a step of filling the magnet insertion holes 15A of the laminate 20 obtained at the step (C) with the resin material 16 to fasten the laminate 20; and
(E) a step of removing the temporarily-interlocking parts 8A from the laminate 20.

To begin with, the roll C of the magnetic metal sheet is prepared, and is mounted on the uncoiler 110. The magnetic metal sheet (metal sheet W) drawn from the roll C is fed to the progressive die 140 (step (A)).

In the progressive die 140, workpieces WR are serially produced by performing stamping on the metal sheet W (step (B)). Referring to FIGS. 8A to 11G the step (B) will be described. FIGS. 8A to 8G are plan views illustrating an overall layout of stamping serially performed by the progressive die 140. FIGS. 8A to 8F each illustrate a state of the metal sheet W after respective steps B1 to B6 described below are performed, and FIG. 8G is a plan view illustrating a workpiece WR that is produced through these steps. FIGS. 9A and 9B are enlarged views of FIGS. 8A and 8B, FIGS. 10C and 10D are enlarged views of FIGS. 8C and 8D, and FIGS. 11E to 11 G are enlarged views of FIGS. 8E to 8G respectively. As long as press loads can be balanced, the layout of stamping is not limited to that depicted in FIGS. 8A to 8G.

The step B1 is a step of forming pilot holes P and openings H1 each constituting part of each weight-reducing hole 18 on the metal sheet W (see FIG. 8A and FIG. 9A). The pilot holes P are holes for positioning the metal sheet W in the progressive die 140.

The step B2 is a step of further forming openings H2 each constituting part of each weight-reducing hole 18 and magnet insertion holes 15 corresponding to one of each pair of the magnet insertion holes 15 (see FIG. 8B and FIG. 9B).

The step B3 is a step of forming magnet insertion holed 15 corresponding to the other one of each pair of the magnet insertion holes 15 on the metal sheet W and also forming cuts 8c at ends of the temporarily-interlocking portions 8 on the metal sheet W by push-back (see FIG. 8C and FIG. 10C).

The step B4 is a step of forming punched holes 9 at positions where swaged areas 8a are to be formed, only when the object to be processed is a workpiece WR positioned in the lowermost layer of the laminate 20 (see FIG. 8D and FIG. 10D).

Figure 11E:
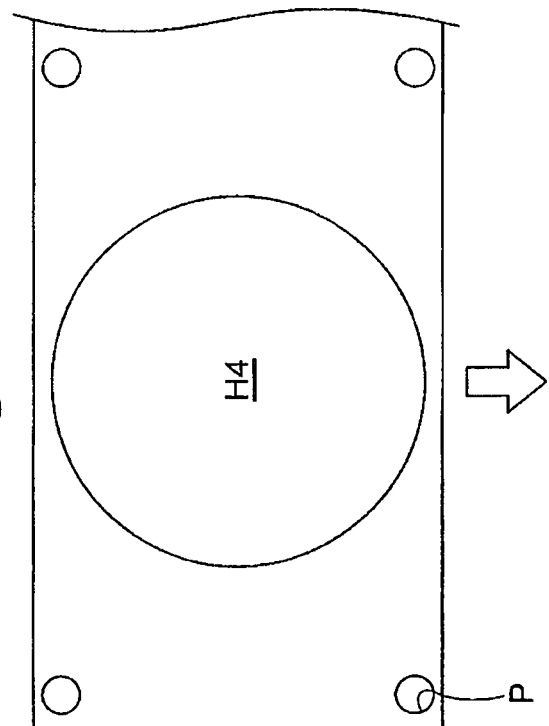
FIGS. 11E to 11G are plan views illustrating a layout of the stamping in a final stage.

The step B5 is a step of further forming an opening H3 positioned in the center on the metal sheet W (see FIG. 8E and FIG. 11E). When the object to be processed is not a workpiece WR positioned at the lowermost layer of the laminate 20, as depicted in FIG. 8E, swaged areas 8a are further formed on the metal sheet W at this step. Alternatively, by adjusting the stroke of the cutter, the swaged areas 8a may be formed at the step B4, or the punched holes 9 may be formed at the step B5.

Figure 11F:
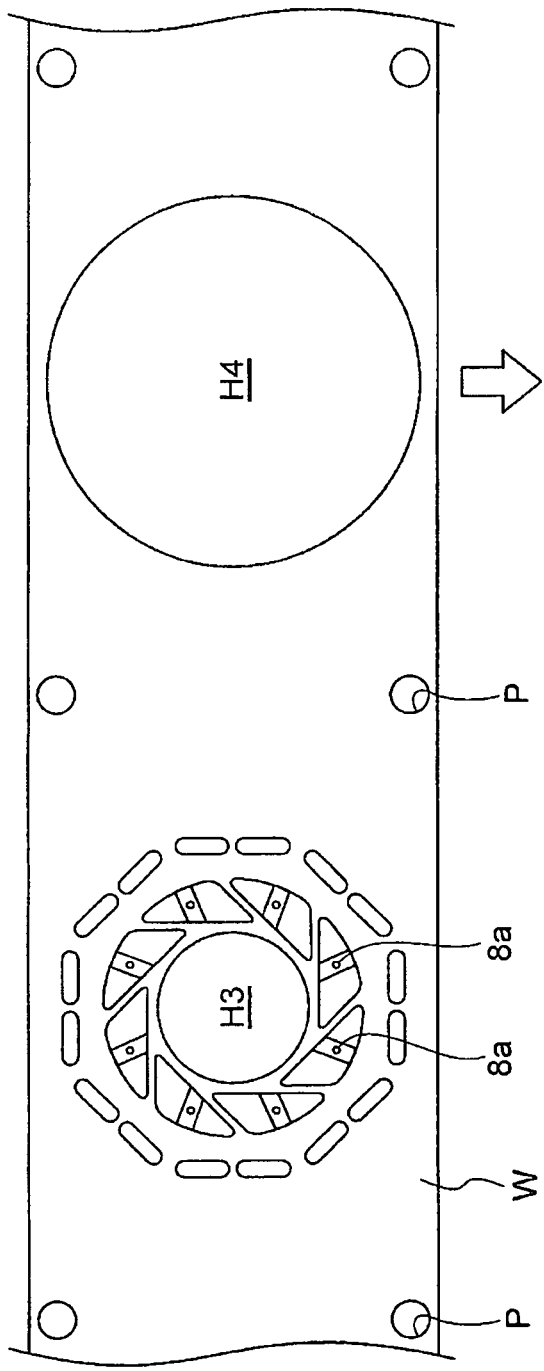

The step B6 is a step of performing stamping at the outer circumference of a workpiece WR (to form an opening H4) (see FIG. 8F and FIG. 11F).

Figure 11G:
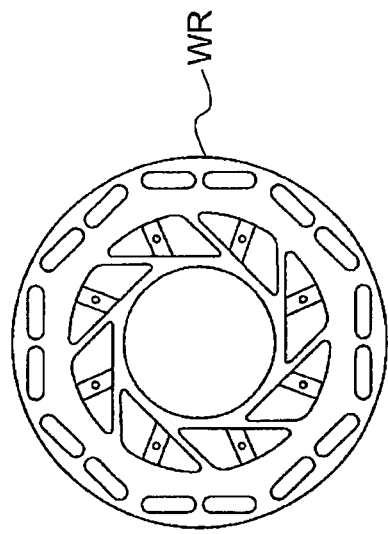

Workpieces WR are obtained through the above-described steps B1 to B6 (see FIG. 8G and FIG. 11G). Subsequently, a predetermined number of the workpieces WR are stacked together, and these workpieces WR are coupled to each other by the swaged areas 8a to obtain the laminate 20 depicted in FIGS. 4 and 5 (step (C)). After inserting magnets into the magnet insertion holes 15A of the laminate 20, by filling the magnet insertion holes 15A with the resin material 16, the laminate 20 is fastened (step (D)). After fastening the laminate 20 with the resin material 16, the temporarily-interlocking parts 8A are removed from the laminate 20 to obtain a rotor R (step (D)). Herein, as long as the laminate 20 does not come apart even after removing the temporarily-interlocking parts 8A, the temporarily-interlocking parts 8A may be removed before the fastening with the resin material 16. For example, in a state in which the laminate 20 is fixed on a resin filling device, the temporarily-interlocking parts 8A may be removed before the filling with the resin material 16, and then the magnet insertion holes 15A may be filled with the resin material 16. Furthermore, the temporarily-interlocking parts 8A may be removed at the same time as the filling with the resin material 16.

Figure 12:
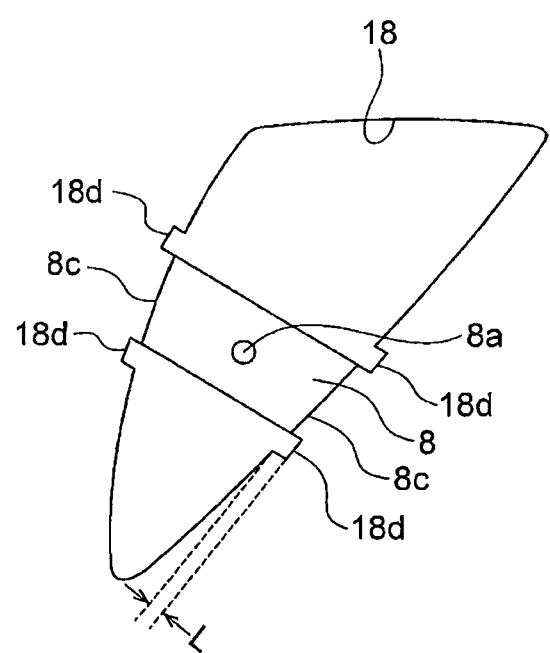
FIG. 12 is a plan view illustrating depressions formed on inner surfaces of a weight-reducing hole in an exaggerated manner.

In the foregoing, one embodiment of this disclosure has been described, but this disclosure is not limited to the above-described embodiment. For example, as depicted in FIG. 12, on inner surfaces of each weight-reducing hole 18, depressions 18d may be formed at positions corresponding to corners of the temporarily-interlocking portion 8. When the cuts 8c are formed by a cutter (punch) at the step B3, the depressions 18d can play a role in retracting the cutter. In other words, forming these depressions 18d can prevent formation of whisker-like burrs when the cuts 8c of each temporarily-interlocking portion 8 are formed. The depth (depth L in FIG. 12) of the depressions 18d may be about 0.02 to 1 millimeter.

In the above-described embodiments, cases have been exemplified in which straight cuts 8c are formed. Alternatively, in order to enhance the joint strength of each temporarily-interlocking portion 8, concaves for engaging ends of the temporarily-interlocking portion 8 may be formed on inner surfaces of each weight-reducing hole 18. By adjusting the area (length in plan view) of the contact surface between each end of the temporarily-interlocking portion 8 and the corresponding inner surface of the weight-reducing hole 18, ease of removing (difficulty of removing) the temporarily-interlocking part 8A can be adjusted.

Figure 13A:
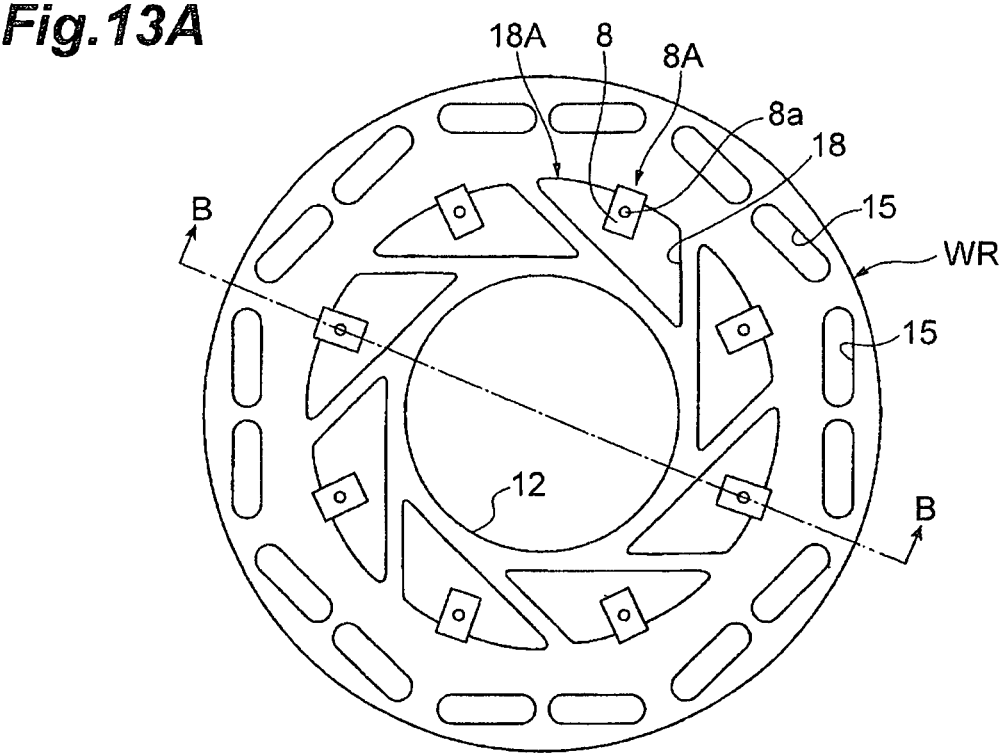
FIG. 13A is a plan view illustrating a laminate according to another embodiment.
Figure 13B:
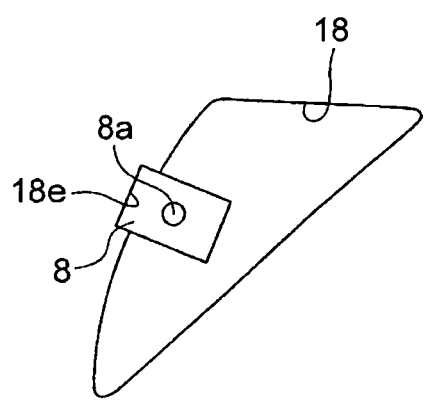
FIG. 13B is a plan view illustrating a weight-reducing hole in an enlarged manner.
Figure 14:
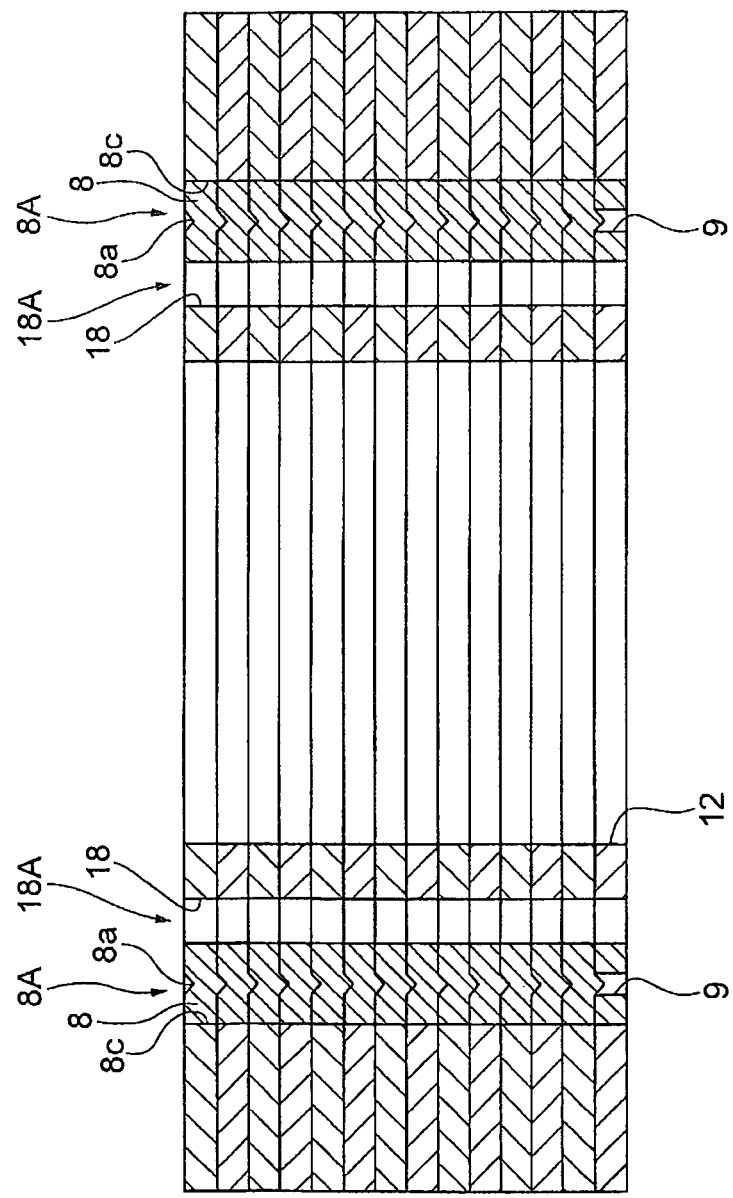
FIG. 14 is a schematic sectional view along line B-B in FIG. 13A.

In the above-described embodiments, cases have been exemplified in which each temporarily-interlocking part 8A is formed so as to bridge the two sides (inner surfaces) 18a and 18b of the corresponding weight-reducing hole 18A. However, the temporarily-interlocking part 8A does not necessarily have to bridge the two sides (inner surfaces) of the weight-reducing hole 18A. For example, as depicted in FIG. 13A, FIG. 13B, and FIG. 14, one concave 18e may be formed on an inner surface of each weight-reducing hole 18 so that an end of the corresponding temporarily-interlocking portion 8 engages with the concave 18e.

Figure 15:
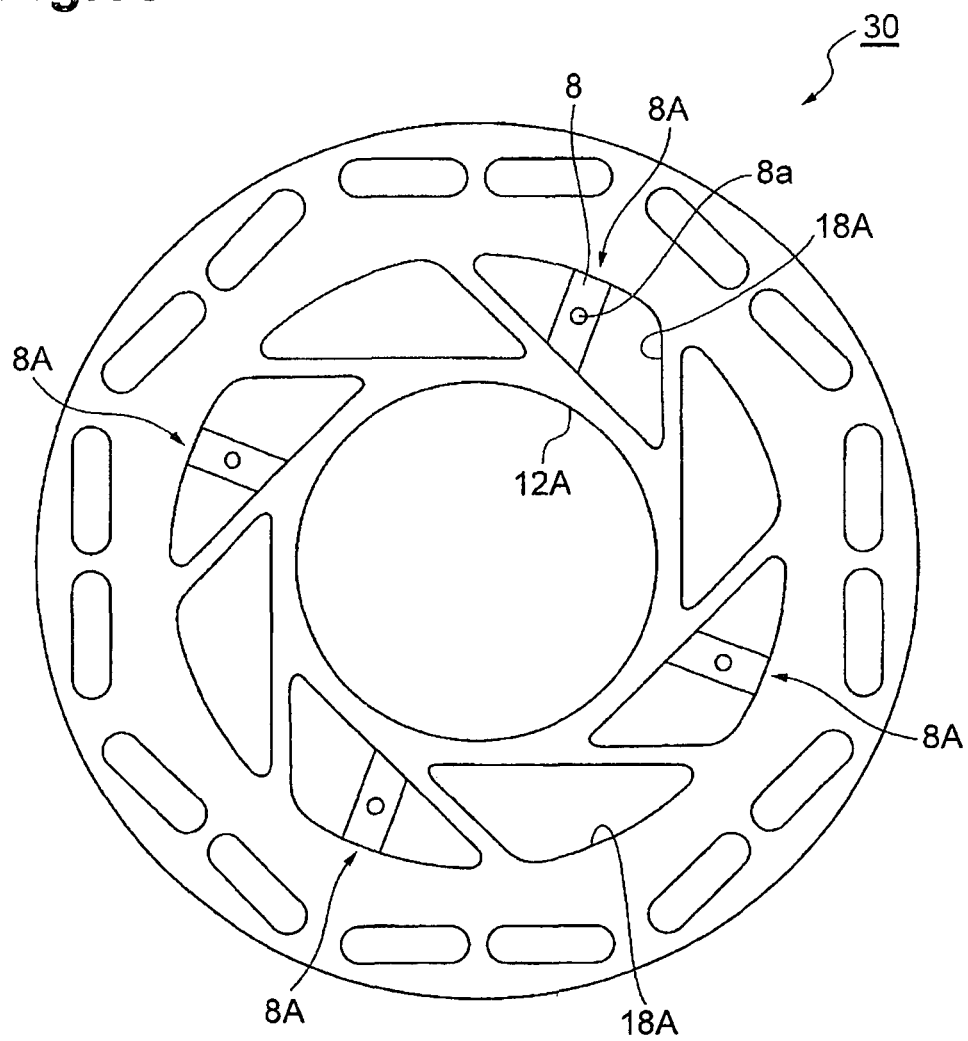
FIG. 15 is a plan view illustrating a laminate according to another embodiment.

In the above-described embodiments, cases have been exemplified in which the temporarily-interlocking parts 8A are provided to all of the weight-reducing holes 18A. However, the temporarily-interlocking parts 8A may be provided to some of the weight-reducing holes 18A. In the laminate 30 for a rotor depicted in FIG. 15, among a total of eight weight-reducing holes 18A aligned along the circumferential direction of the shaft hole 12A, every other weight-reducing hole 18A is provided with a temporarily-interlocking part 8A, and a total of four weight-reducing holes 18A each have the temporarily-interlocking part 8A.

Figure 16:
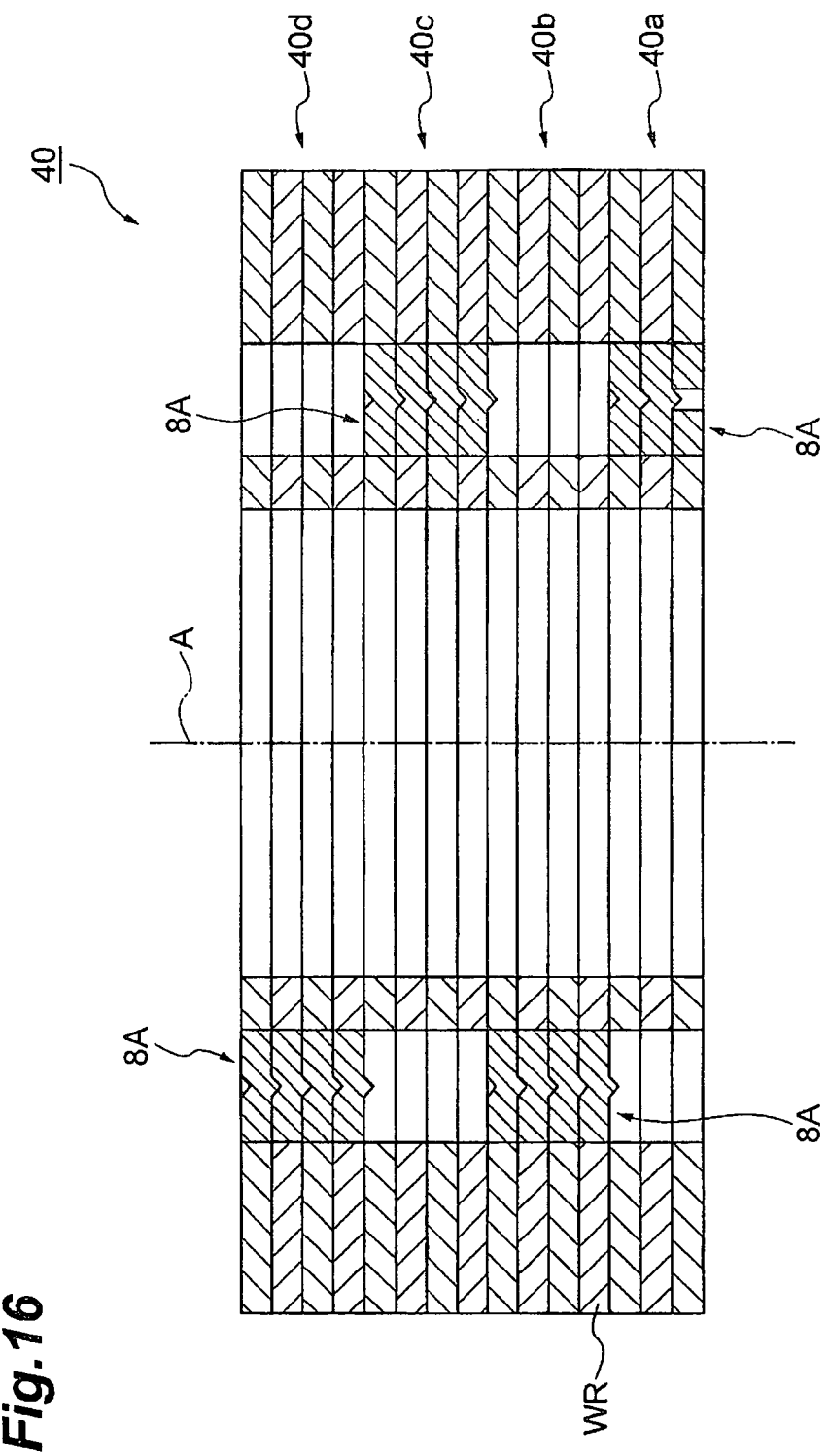
FIG. 16 is a schematic sectional view illustrating a laminate according to another embodiment.

In the above-described embodiments, temporarily-interlocking parts 8A each formed by laminating temporarily-interlocking portions 8 the number of which is the same as that of workpieces WR constituting a laminate 20 have been exemplified. However, each temporarily-interlocking part may include temporarily-interlocking portions 8 the number of which is smaller than that of the workpieces WR constituting a laminate 10 (see FIG. 16). By regularly aligning weight-reducing holes 18A each having a temporarily-interlocking part 8A and weight-reducing holes 18A each having no temporarily-interlocking part 8A and performing rotational lamination on the workpieces WR, the laminate 40 for a rotor depicted in FIG. 16 can be obtained. The term "rotational lamination" means relative shifting of the angle between a laminate of workpieces that have been stacked and a workpiece to be newly stacked on the laminate that is performed when a laminate is obtained by laminating workpieces. This laminate. 40 includes four blocks 40a, 40b, 40c, and 40d. After the block 40a is obtained, when a workpiece WR constituting the lowermost layer of the block 40b is stacked on the upper surface of the block 40a, the block 40b is rotated 45° about the central axis line A and then the workpiece WR is stacked thereon. In the same manner, rotational lamination is performed at the beginning of preparing the block 40c and the block 40d, whereby the laminate 40 can be obtained. Reducing the laminating thickness of the temporarily-interlocking parts 8A advantageously allows the temporarily-interlocking parts 8A to be easily removed.

Figure 17:
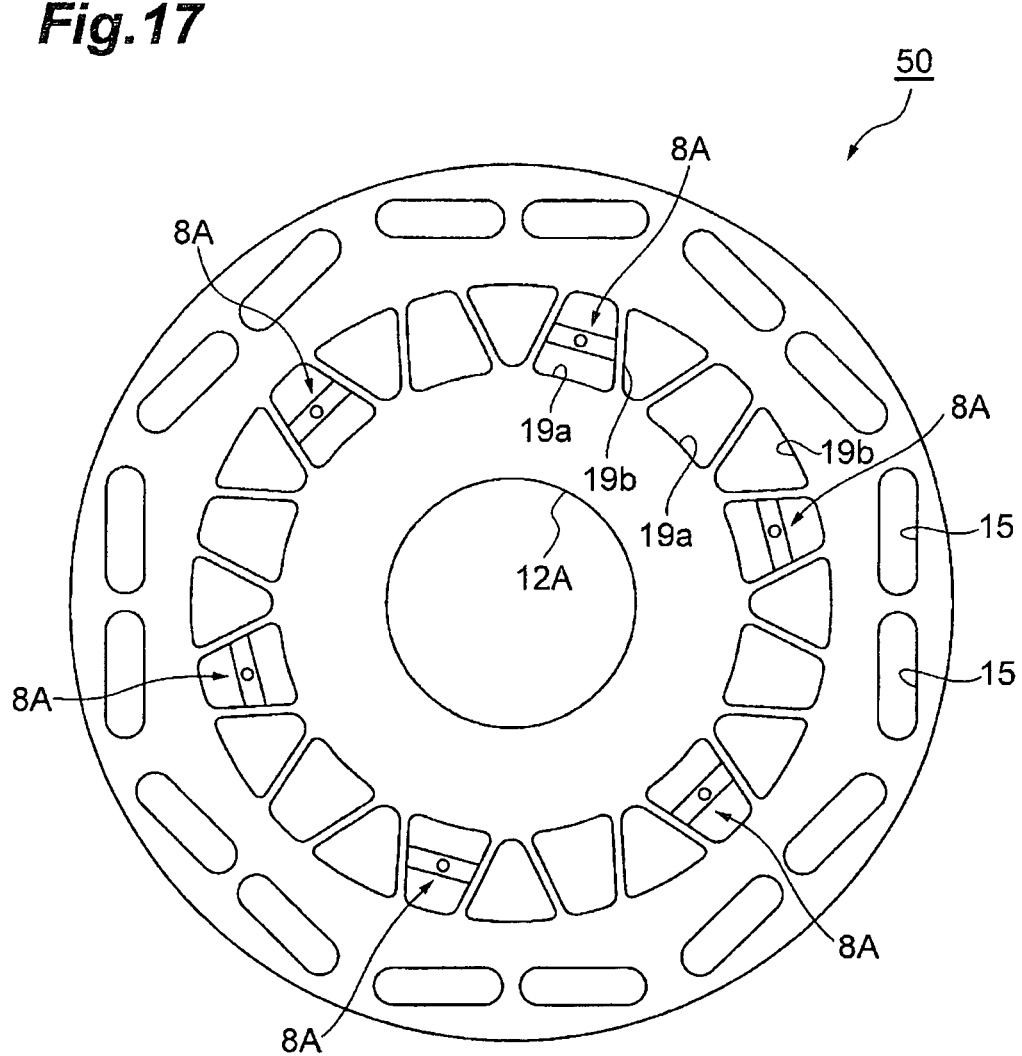
FIG. 17 is a plan view illustrating a laminate according to another embodiment.

In the above-described embodiments, the weight-reducing holes 18 have been exemplified each having a substantially triangular shape. However, each weight-reducing hole 18 may have a substantially polygonal shape, a substantially circular shape, or a substantially elliptical shape. In the laminate 50 for a rotor depicted in FIG. 17, weight-reducing holes 19a each having a substantially trapezoidal shape and weight-reducing holes 19b each having a substantially triangular shape are regularly aligned along the circumferential direction of the shaft hole 12A. More specifically, with respect to a weight-reducing hole 19a having a temporarily-interlocking part 8A, next to this hole, a weight-reducing hole 19b having a substantially triangular shape is formed. Furthermore, next to this hole, a weight-reducing hole 19a having no temporarily-interlocking part 8A is formed, and next to this hole, a weight-reducing hole 19b having a substantially triangular shape is formed. Out of a total of 12 weight-reducing holes 19a each having a substantially trapezoidal shape, in a total of six weight-reducing holes 19a, the temporarily-interlocking parts 8A are formed.

In the above-described embodiments, cases have been exemplified in which only workpieces WR for a rotor are stamped out from one metal sheet W, but both of the workpieces WR and the workpieces for a stator may be stamped out from one metal sheet W. Furthermore, the stamping may be performed on a plurality of plates for processing W that are stacked together to obtain the workpieces WR.

Figure 18:
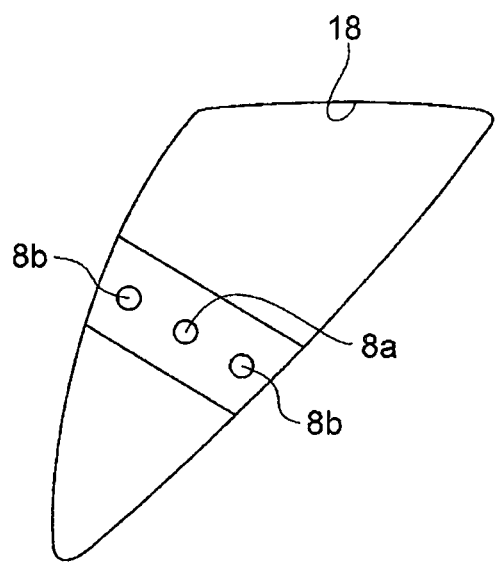
FIG. 18 is a plan view schematically illustrating one example of a temporarily-interlocking portion including adjustment portions.

In the above-described embodiments, temporarily-interlocking portions 8 each having only the swaged area 8a formed thereon have been exemplified, but adjustment portions 8b for adjusting tension on each temporarily-interlocking portion 8 may be formed on each temporarily-interlocking portion 8 (see FIG. 18). Reducing the tension on the temporarily-interlocking portion 8 allows the temporarily-interlocking part 8A to be easily removed. Conversely, increasing the tension on the temporarily-interlocking portion 8 can make it difficult to remove the temporarily-interlocking part 8A. When tension on the temporarily-interlocking portion 8 is high, through holes may be formed as the adjustment portions 8b on the temporarily-interlocking portion 8 so as to reduce the tension. When tension on the temporarily-interlocking portion 8 is low, in order to increase the tension, swaged areas may be additionally formed as the adjustment portions 8b on the temporarily-interlocking portion 8, or crushed areas or half-blanked areas may be formed on the temporarily-interlocking portion 8. The above-described swaged areas formed as the adjustment portions 8b on the temporarily-interlocking portion 8 may be used for coupling the temporarily-interlocking portion 8 to another one. FIG. 18 illustrates a case in which two adjustment portions 8b are formed with one swaged area 8a interposed therebetween, but the number and the positions of the adjustment portions 8b are not limited to this.

In the above-described embodiments, cases have been exemplified in which the laminate 20 is finally fastened by filling the magnet insertion holes 15A of the laminate 20 with the resin material 16. However, the laminate 20 may be more securely fastened by forming extra holes to be filled with resin in addition to the magnet insertion holes 15A and filling the extra holes with the resin material 16. Other fastening means (e.g., welding and adhesive) may be used in combination with the resin material 16.

Paragraph [0024] of WO2010/082465 contains the expression "After the laminated core 110 is integrally formed by the insulating resin 13 and coils are wound thereon, the fixture 120 is slid in the laminating direction (direction A in FIG. 2) to be removed from the fitting depression 11c of the back yoke part 11a". In the invention described in WO2010/082465, the direction of removing the fixture 120 is limited to the laminating direction, and there is room for improvement in this point. In addition, when the fixture 120 is slid over the laminated core 110, magnetic metal sheets constituting the laminated core 110 may be flipped.

As described above, a manufacturing method according to one aspect of the present disclosure is a method for manufacturing a laminate used for manufacturing a rotor. The method includes: (a) performing stamping on a metal sheet to obtain a workpiece having a temporarily-interlocking portion; and (b) integrating the workpiece in plurality by the temporarily-interlocking portion to obtain the laminate. The workpiece has a shaft hole into which a shaft is inserted, a magnet insertion hole into which a magnet is inserted, and a weight-reducing hole formed between the shaft hole and the magnet insertion hole. The temporarily-interlocking portion is provided to the weight-reducing hole.

By the above-described manufacturing method according to one aspect of the present disclosure, a laminate including the temporarily-interlocking part in the weight-reducing hole is manufactured. The weight-reducing hole is a hole that is formed on a workpiece (magnetic metal sheet) to reduce the weight of a rotor. The weight-reducing hole may have the effect of cooling the rotor. The shape of the weight-reducing hole is not limited to a specific one, and may be a shape selected from the group consisting of a substantially triangular shape, a substantially polygonal shape, a substantially circular shape, and a substantially elliptical shape, for example.

Each workpiece may have the weight-reducing hole aligned in plurality along a circumferential direction of the shaft hole. This arrangement including the weight-reducing holes is advantageous for a laminating method called "rotational lamination". The above-described step (b) may include a step of the above-described rotational lamination. When producing a laminate, performing rotational lamination on workpieces can compensate for variations in thickness of a magnetic metal sheet used as a raw material, thereby making it possible to reduce the adverse effects associated with the variations.

The temporarily-interlocking portion may be provided to all of the weight-reducing holes, or the temporarily-interlocking portion may be provided to some of the weight-reducing holes. When the temporarily-interlocking portion is provided to some of weight-reducing holes out of a plurality of weight-reducing holes aligned along the circumferential direction of the shaft hole, it is preferable that the weight-reducing holes to each of which the temporarily-interlocking portion is provided and the weight-reducing holes to each of which the temporarily-interlocking portion is not provided be regularly aligned. Using this configuration is advantageous in that, even when rotational lamination is performed on a plurality of workpieces, adjusting the angle of the rotational lamination enables the workpieces to be integrated into a laminate by the temporarily-interlocking portions (see FIG. 15), and temporarily-interlocking parts each having a desired thickness can be formed (see FIG. 16), for example.

From viewpoints of achieving a joint strength at the temporarily-interlocking portions in the weight-reducing holes equal to or higher than a required strength and facilitating removability of the temporarily-interlocking portions from inner surfaces of weight-reducing holes, each temporarily-interlocking portion may have a side extending parallel to an inner surface of the corresponding weight-reducing hole. Alternatively, an inner surface of each weight-reducing hole may have a concave for engaging the corresponding temporarily-interlocking portion (see FIGS. 13A and 13B). From the same viewpoints, each temporarily-interlocking portion may have an adjustment portion for adjusting tension at the temporarily-interlocking portion (see FIG. 18).

According to one aspect of the present disclosure, a method for manufacturing a rotor from a laminate including a temporarily-interlocking part is provided. Specifically, the method for manufacturing a rotor according to one aspect of the present disclosure includes the following steps:

(c) fastening a laminate manufactured by the above-described manufacturing method by resin material, welding, or adhesive singly or in combination; and (d) a step of removing a temporarily-interlocking part that is formed by laminating the temporarily-interlocking portion in plurality.'

In the above-described manufacturing method, by removing the temporarily-interlocking part from the laminate, a laminated core having no swaged area can be finally obtained. In order to prevent magnetic metal sheets constituting the laminate from being flipped when removing the temporarily-interlocking part from the laminate, at the above-described step (d), the temporarily-interlocking part may be removed in a direction orthogonal to a laminating direction of the workpieces.

According to one aspect of the present disclosure, a laminate used for manufacturing a rotor and including a temporarily-interlocking part is provided. Specifically, the laminate for a rotor according to one aspect of the present disclosure includes: a shaft hole into which a shaft is inserted; a magnet insertion hole into which a magnet is inserted; a weight-reducing hole formed between the shaft hole and the magnet insertion hole; and a temporarily-interlocking part provided to the weight-reducing hole. This laminate is useful for manufacturing a rotor having no swaged area because the temporarily-interlocking part can be removed in a sufficiently easy manner.

According to a plurality of embodiments of the present disclosure, a laminate for a rotor from which the temporarily-interlocking part can be removed in a sufficiently easy manner is provided.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

What is claimed is:

1. A method for manufacturing a laminate used for manufacturing a rotor, the method comprising the steps of:
   (a) stamping out a plurality of workpieces from a metal sheet wherein each of the workpieces has a temporarily-interlocking portion; and
   (b) obtaining the laminate including the workpieces integrated together by the temporarily-interlocking portion, wherein each of the workpieces further has a shaft hole, a magnet insertion hole, and a weight-reducing hole formed between the shaft hole and the magnet insertion hole, and the temporarily-interlocking portion is provided to the weight-reducing hole.

2. The method according to claim 1, wherein the weight-reducing hole has a shape selected from the group consisting of a substantially triangular shape, a substantially polygonal shape, a substantially circular shape, and a substantially elliptical shape.

3. The method according to claim 1, wherein the temporarily-interlocking portion has a side extending parallel to an inner surface of the weight-reducing hole.

4. The method according to claim 1, wherein an inner surface of the weight-reducing hole has a concave for engaging the temporarily-interlocking portion.

5. The method according to claim 1, wherein the workpiece has the weight-reducing hole aligned in plurality along a circumferential direction of the shaft hole.

6. The method according to claim 5, wherein the weight-reducing holes to each of which the temporarily-interlocking portion is provided and the weight-reducing holes to each of which the temporarily-interlocking portion is not provided are regularly aligned.

7. The method according to claim 5, wherein the step (b) further comprising a step of relatively shifting an angle between the laminate of the workpieces that have been stacked and a workpiece that is to be newly stacked on the laminate.

8. The method according to claim 6, wherein the step (b) further comprising a step of relatively shifting an angle between the laminate of the workpieces that have been stacked and a workpiece that is to be newly stacked on the laminate.

9. The method according to claim 1, wherein the temporarily-interlocking portion has an adjustment portion for adjusting tension at the temporarily-interlocking portion.

10. A method for manufacturing a rotor, the method comprising the steps of:

(c) fastening a laminate manufactured by the method according to claim 1 by resin material, welding, or adhesive singly or in combination; and (d) removing a temporarily-interlocking part formed by laminating the temporarily-interlocking portion in plurality.

11. The method for manufacturing a rotor according to claim 10, wherein at the step (d), the temporarily-interlocking part is removed in a direction orthogonal to a laminating direction of the workpieces.

* * * * *